United States Patent [19]
von Keudell et al.

[11] Patent Number: 6,055,142
[45] Date of Patent: Apr. 25, 2000

[54] MANUALLY GUIDED MACHINE TOOL WITH A SAFETY DEVICE

[75] Inventors: Leopold von Keudell, Saalem; Karl Echtler, Puchheim, both of Germany

[73] Assignee: Hilti Aktiengesellschaft, Schaan, Liechtenstein

[21] Appl. No.: 09/065,355

[22] Filed: Apr. 23, 1998

[30] Foreign Application Priority Data

Apr. 23, 1997 [DE] Germany .......................... 197 17 164

[51] Int. Cl.$^7$ .................................................. H02H 3/00
[52] U.S. Cl. ............................ 361/42; 361/42; 361/45; 361/93.1; 361/115
[58] Field of Search ..................... 361/42, 45, 93.1, 361/115

[56] References Cited

U.S. PATENT DOCUMENTS 3,761,774  9/1973  Laughinghouse et al. ............... 361/42

*Primary Examiner*—Stephen W. Jackson
*Attorney, Agent, or Firm*—Brown & Wood, LLP

[57] ABSTRACT

A hand held machine tool has a protective electrode (1; 1a, 1b, 1c) located within a housing with a leakage current protective switch (2; 2a, 2b, 2c) triggered by a fixed leakage current ($\Sigma 1_A$), for example, 10 mA, for interrupting power supply leads (4, 5) of the machine tool with a protective conductor (3) connected to the protective electrode (1; 1a, 1b, 1c) and not being switched off.

12 Claims, 2 Drawing Sheets

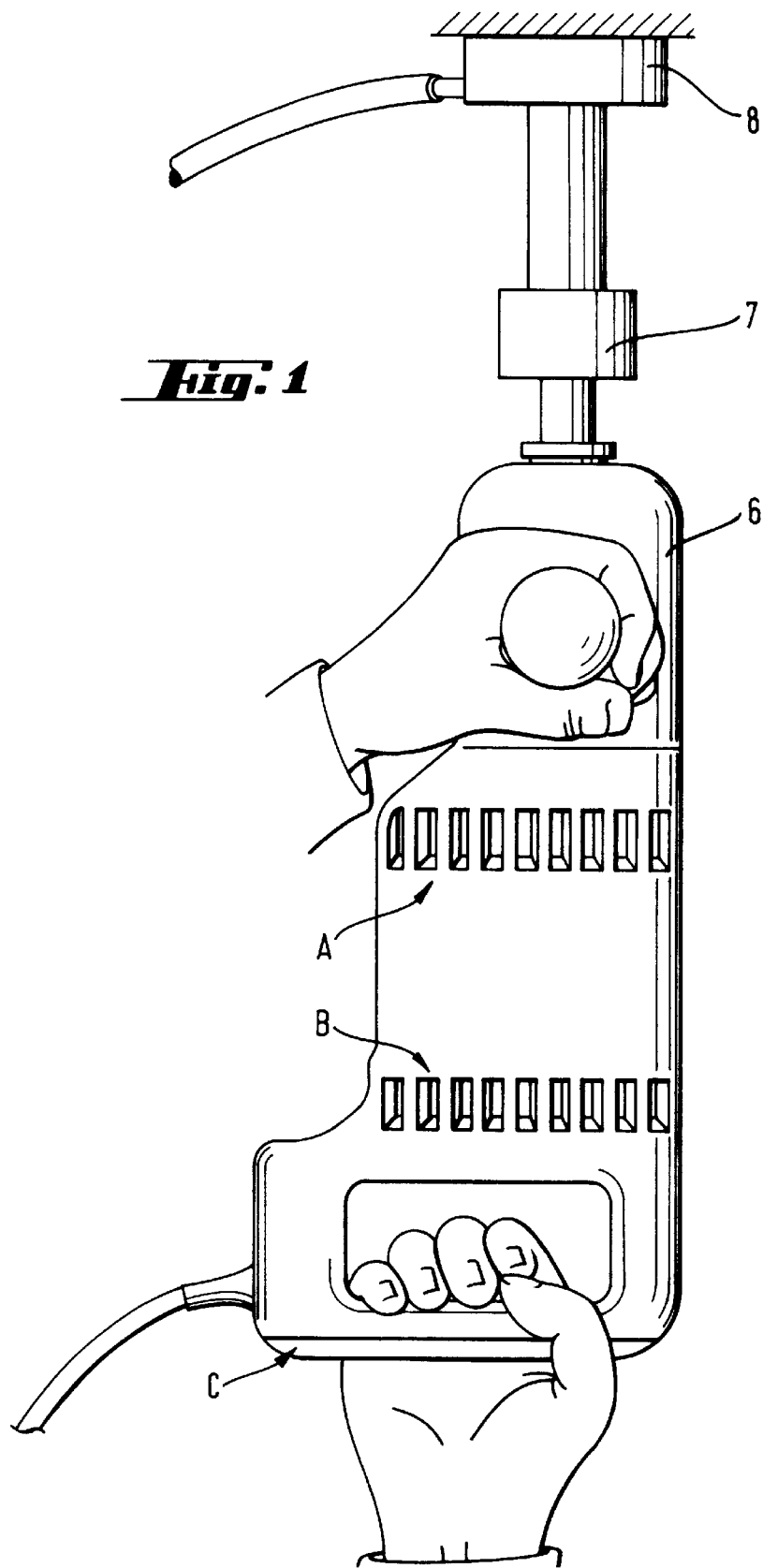

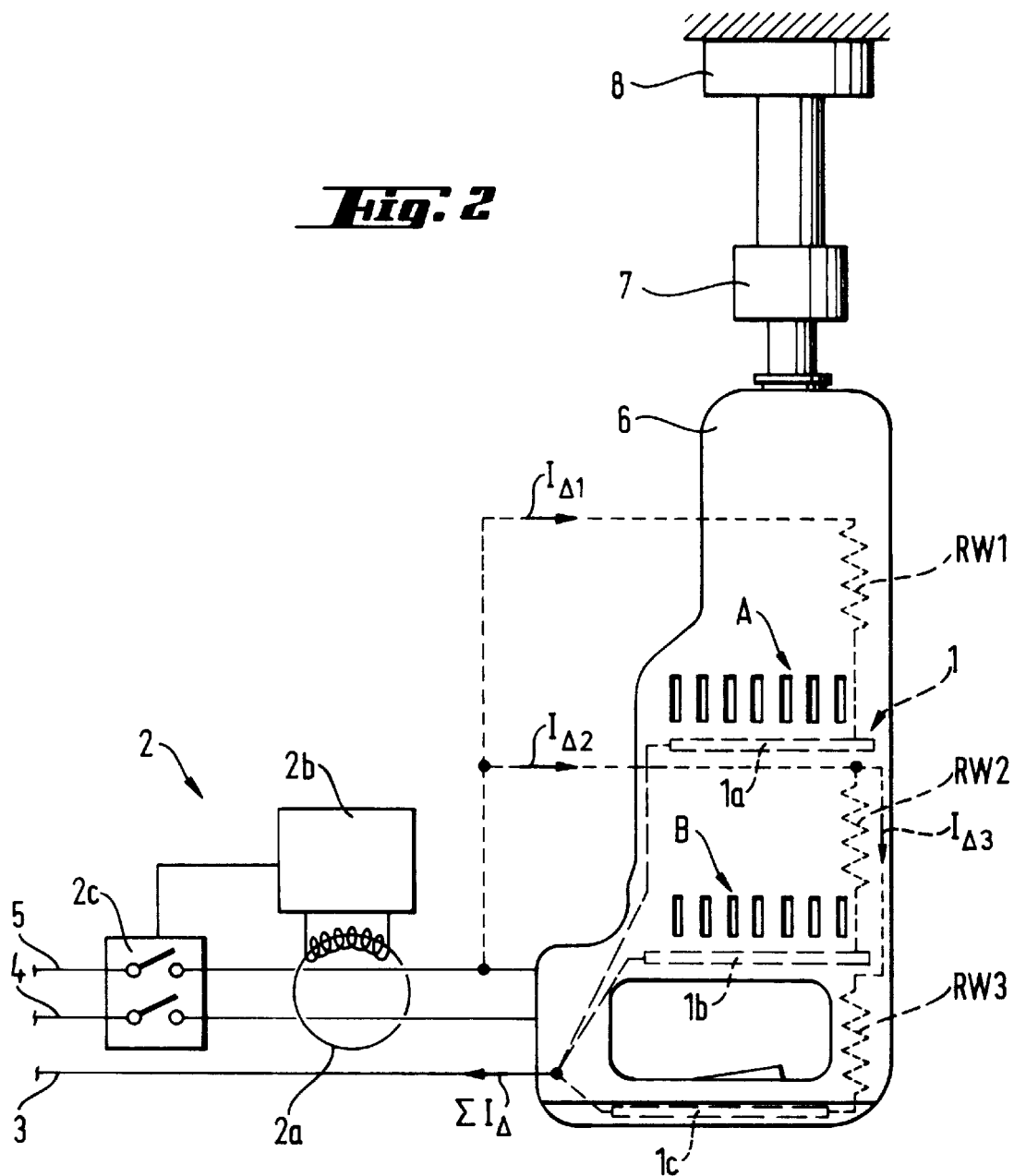

MANUALLY GUIDED MACHINE TOOL WITH A SAFETY DEVICE

BACKGROUND OF THE INVENTION

The present invention is directed to a hand held machine tool with a safety device, in particular for protecting the tool operator when water penetrates into the tool handle or when the tool housing develops a conducting connection with the power supply because of water or conductive dirt or in some other comparable manner.

In German patent 950 658, a protective device for a hand held machine tool is disclosed, driven by an electric motor, which is separated from the metal parts of the tool housing by insulated parts and with bare electrodes located within the tool housing at locations most exposed to dust or dirt. The electrodes are connected to ground or with a neutral point in the power supply network and serve to dissipate leakage currents. This safety device does not function when the neutral or ground conductor, connected with the electrode, is interrupted. When water penetrates into the housing, there is the danger that, because of the longer "water leakage paths", a not inconsiderable portion of the leakage currents, possibly present, are dissipated over the operator to ground. Additionally, such an arrangement leads to slight electric shock, in severe cases, however, it may lead to an electrical accident.

The German Auslegeschrift 1 105 977 discloses a leakage current protection for which a short-circuit current, passing over a dirty insulating material carrier to bare electrodes, can cause an overcurrent protection circuit breaker, usually disposed in the power supply network, to respond. This leakage current protection functions independently of the grounded conductor. This device, intended to protect against leakage current and located in the interior of the protective housing, which is preferably exposed to contamination during the operation of the hand-held machine tool, cannot effectively protect the user, especially in the case of water entering the tool housing, but also in the case of other types of contamination, since modern overcurrent protection circuit breakers, usually disposed in power supply networks, normally respond only to currents 16 A or greater.

SUMMARY OF THE INVENTION

Therefore, a primary object of the present invention is to provide a safety device for hand held machine tools which effectively protects a tool operator against electrical accidents.

In accordance with the present invention, a hand held machine tool has a protective electrode located within the tool housing and includes a leakage current protective switch triggered by a fixed leakage current, so that it interrupts the power supply leads to the hand held machine tool without switching off the grounded conductor.

In a preferred embodiment, the leakage current protective switch is triggered at a leakage current of 10 mA.

Another preferred embodiment of the invention is characterized by the fact that the protective electrode is grounded, because the leakage currents can be dissipated selectively over the grounded conductor.

Further advantages of the invention are set forth in the dependent claims.

A particular advantage of the present invention is that the operator of the hand held machine tool is protected when the grounded conductor is intact, as well as when it is interrupted. When the grounded conductor is intact, the leakage current is dissipated over the grounded conductor without it being noticed by the tool operator. Since tool operation is switched off at a very low leakage current level, the tool is optimally protected against damage due to the leakage currents. If the grounded conductor is interrupted, a certain maximum leakage current, at a harmless level, flows over the operator to ground. When this harmless leakage current is exceeded, the supply current is switched off by the leakage current protective switch.

Leakage currents of less than 10 mA, the amperage at which the leakage current protective switch is triggered in a preferred embodiment of the invention, are regarded as relatively harmless, but nevertheless may cause an extremely unpleasant effect. There is sufficient protection for the tool operator, however, since the supply current is switched off within 200 msec when the leakage current is greater than the rated current of the leakage current protective switch of 10 mA. The triggering limit may also be lower than 10 mA. If the limit is set too low, however, incorrect triggering may occur.

The multi-part construction of the protective electrode, disclosed as a preferred embodiment of the invention, has the advantage that the individual parts of the protective electrodes can be located wherever the voltage can be carried off over "water paths" or conducting layers of dirt. Due to the plastic construction of the housing of the tool, voltage can be transferred to the operator only when the voltage is carried over air gaps or assembly joints to the plastic surfaces that can be touched. Therefore, the arrangement of the protective electrode in the regions of the openings of the tool housing is particularly suitable and advantageous.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the Drawing:

FIG. 1 is a schematic illustration of a hand held machine tool or drill, for example, used for overhead drilling, with the hands of the tool operator shown holding the tool, and FIG. 2 is a schematic showing of the inventive drill with a three-part protective electrode, mounted in the drill housing and also showing the path of flow of the leakage currents.

DETAILED DESCRIPTION OF THE INVENTION

In FIG. 1, a hand held drill or tool is shown for use in overhead drilling. The drill housing 6 contains a first set of ventilating slots A, a second set of ventilating slots B spaced from the first set, and an assembly joint C. As shown in the overhead drilling position, the lower end of the drill housing 6 forms a handle with the assembly joint C located in the lowermost part of the handle. As illustrated, the drill is water cooled and has a water collecting device 8 and a swivel or flush joint 7. If the water collecting device 8 does not operate properly or if the flush joint 7 leaks, the drill can fill with water and the voltage can be dissipated by a water path over the ventilating slots A or B or the assembly joint C to the operator. This phenomenon can, of course, also occur in other hand held machine tools, even if they are not water cooled, if they come in contact with water or if conductive layers of dirt collect on and/or in them.

In FIG. 2 the drill shown schematically in FIG. 1 is illustrated. In this embodiment, however, it is provided with a three-part protective electrode 1 consisting of individual electrodes 1a, 1b and 1c and with a leakage current protective switch 2 including a summation transformer 2a, evaluation electronics 2b and an interrupter switch 2c. The individual electrode 1a is located below the ventilating slots A, the individual electrode 1b is positioned below the ventilating slots B and the individual electrode 1c is arranged below the assembly joint C. The individual electrodes 1a–1c are connected to one another and to a protective conductor 3. For the embodiment shown, three leakage currents $I_{A1}$, $I_{A2}$ and $I_{A3}$ are drawn by way of example and flow from one of the power supply leads 4, 5, as illustrated from the line 5, over resistances RW1, RW2 and RW3, which are formed by water paths, and the individual electrodes 1a–1c to the protective electrode 1 at the protective conductor 3.

If the protective conductor 3 is intact, the protective electrode 1 is at the potential of the protective conductor 3. If the total leakage current $\Sigma 1_A = I_{A1} + I_{A2} + I_{A3}$ flowing through the protective conductor 3, exceeds the rated current of the leakage current protective switch 2, which is 10 mA in this embodiment, then it is noted by a summation transformer 2a and the evaluation electronics 2b, and the power supply current is switched off by the interrupter switch 2c which interrupts the power voltage leads 4, 5. As a result, leakage current can no longer develop and dissipate over the operator.

If the protective conductor 3 is defective, the whole of the leakage current $\Sigma 1_A$ a flows to ground over the operator. In this instance, however, the limit of the total leakage current $\Sigma 1_A$ is less than 10 mA, since, if the rated current is exceeded, the tool is switched off within 200 msec.

To measure the leakage current, the summation transformer 2a is used. The summation transformer 2a is formed of a toroidal core with a winding, through which the ingoing lead 4 and the outgoing lead 5 of the power supply network voltage are passed. If the same current flows through the two leads 4, 5 (no leakage current present), then no current is induced in the coil of the toroidal core, however, if the currents differ, it can be recognized by a current induced in the coil that a leakage current is flowing and the magnitude of the current can be determined. The evaluation electronics 2b determine the current induced in the coil and triggers the protective switch 2c, so that the power leads 4, 5 are interrupted when the leakage current rises above 10 mA.

There are leakage current protective switches with summation transformers which work without an electronics system.

The elements of the leakage current protective switch 2, contrary to the schematic representation in FIG. 2, can also be located within the housing 6 of the machine tool.

As viewed in FIG. 1, the handle of the housing 6 is in the lowermost position and the protective electrode 1; 1a, 1b and 1c are located in the handle and remain in the original position when the handle is open or a lid of the handle is removed.

As shown in FIG. 2, the protective electrode 1; 1a, 1b and 1c can be constructed in several parts. The protective electrode is located in at least one of the preferred working positions of the tool at the lowest point of the tool, where moisture is most likely to collect. Further, the protective electrode is arranged at positions within the housing where conductive media can accumulate. Moreover, the protective electrode works in all operating positions of the machine tool.

The protective electrode 1; 1a, 1b and 1c has at least one of pans and/or ribs and/or barriers. Further, the surfaces of the grounded electrode are as large as possible.

The protective electrode 1; 1a, 1b and 1c is formed of a corrosion resistant material.

While specific embodiments of the invention have been shown and described in detail to illustrate the inventive principles, it will be understood that the invention may be embodied otherwise without departing from such principles.

We claim:

1. A hand held machine tool comprises a housing (6), a protective electrode (1) located within said housing and constructed of several spaced parts (1a, 1b, 1c), a protective conductor (3) connected to said protective electrode, a leakage current protective switch (2) connected to protective switch (2) connected to said protective electrode and triggered by a fixed leakage current ($\Sigma 1\Delta$) for interrupting power supply leads (4, 5) of the machine tool with said protective conductor (3) not being switched off when the fixed leakage current is exceeded, said housing (6) having an overhead working position with an upper working end and a lower end forming a handle, said protective electrode (11) including said several parts (1a, 1b, 1c) positioned at a lowest region of such housing (6) in said overhead working position where moisture is likely to collect, said housing having openings therein (A, B, C) in the lowest region thereof and said parts (1a, 1b, 1c) of said protective electrode (1) located adjacent said openings (A, B, C), and said parts (1a, 1b, 1c) of said protective electrode adjacent said openings (A, B, C) being located where conductive media can accumulate.

2. A hand held machine tool, set forth in claim 1, wherein said leakage current protective switch (2) is triggered by a leakage current ($\Sigma 1_A$) of at most 10 mA.

3. A hand held machine tool, as set forth in claim 1 or 2, wherein said protective electrode (1) is grounded.

4. A hand held machine tool, as set forth in claim 3, wherein said leakage current protective switch (2) determines the leakage current on the basis of a current flowing to ground.

5. A hand held machine tool, as set forth in claim 1 or 2, including a summation transformer (2a), said leakage current protective switch (2) detects the leakage current by means of said summation transformer, and said summation transformer detects the difference between the currents flowing in said power supply leads (4, 5) of the machine tool.

6. A hand held machine tool, as set forth in claim 1 or 2, wherein said protective electrode parts (1a, 1b, 1c) are located in said handle in an original position and remain in the original position when said handle is opened or a lid of the handle is removed.

7. A hand held machine tool, as set forth in claim 1 or 2, wherein said protective electrode parts (a, 1b, 1c) are branched and held by the branches.

8. A hand held machine tool, as set forth in claim 1 or 2, wherein said protective electrode parts (1a, 1b, 1c) work in all operating positions of said machine tool.

9. A hand held machine tool, as set forth in claim 1 or 2, wherein said protective electrode parts (1a, 1b, 1c) have at least one of pans, ribs and barriers.

10. A hand held machine tool, as set forth in claim 1 or 2, wherein said protective electrode parts (1a, 1b, 1c) have a surface as large as possible.

11. A hand held machine tool, as set forth in claim 1 or 2, wherein said protective electrode parts (1a, 1b, 1c) are formed of a corrosion resistant material.

12. A hand held machine tool, as set forth in claim 1 or 2, wherein said housing is axially elongated with said working end and such lower end including said handle being in substantially axially aligned relation.

* * * * *